(No Model.) 3 Sheets—Sheet 1.

J. CAMPBELL & D. H. KELLEY.
STEAM SHOVEL.

No. 600,061. Patented Mar. 1, 1898.

WITNESSES
J. W. Dolon
L. A. Walsh

INVENTORS
Jeremiah Campbell
Daniel H. Kelley
by their attys
Clarke & Raymond

UNITED STATES PATENT OFFICE.

JEREMIAH CAMPBELL AND DANIEL H. KELLEY, OF CHELSEA, MASSA-
CHUSETTS.

STEAM-SHOVEL.

SPECIFICATION forming part of Letters Patent No. 600,061, dated March 1, 1898.

Application filed June 11, 1897. Serial No. 640,309. (No model.)

*To all whom it may concern:*

Be it known that we, JEREMIAH CAMPBELL and DANIEL H. KELLEY, citizens of the United States, residing at Chelsea, in the county of Suffolk and State of Massachusetts, have invented a new and Improved Steam-Shovel, of which the following is a full, clear, and exact description, reference being had to the accompanying drawings, forming a part of this specification, in explaining its nature.

Our invention relates to steam-shovels for unloading coal-barges. The shovels are supported on a trolley running on an overhead track operated by a steam-engine, which also raises the shovel and closes the same. The shovel descends by the force of gravity, and its jaws are so weighted as to open when the closing rope or chain is relaxed. Such shovels are adapted to operate with great rapidity, and it is desirable that the closing mechanism should be of the simplest character, so that it may act promptly and efficiently. We have accomplished this result by the hereinafter-described apparatus, which is shown as applied to that class of shovels called "clam-shell" shovels.

Figure 1:
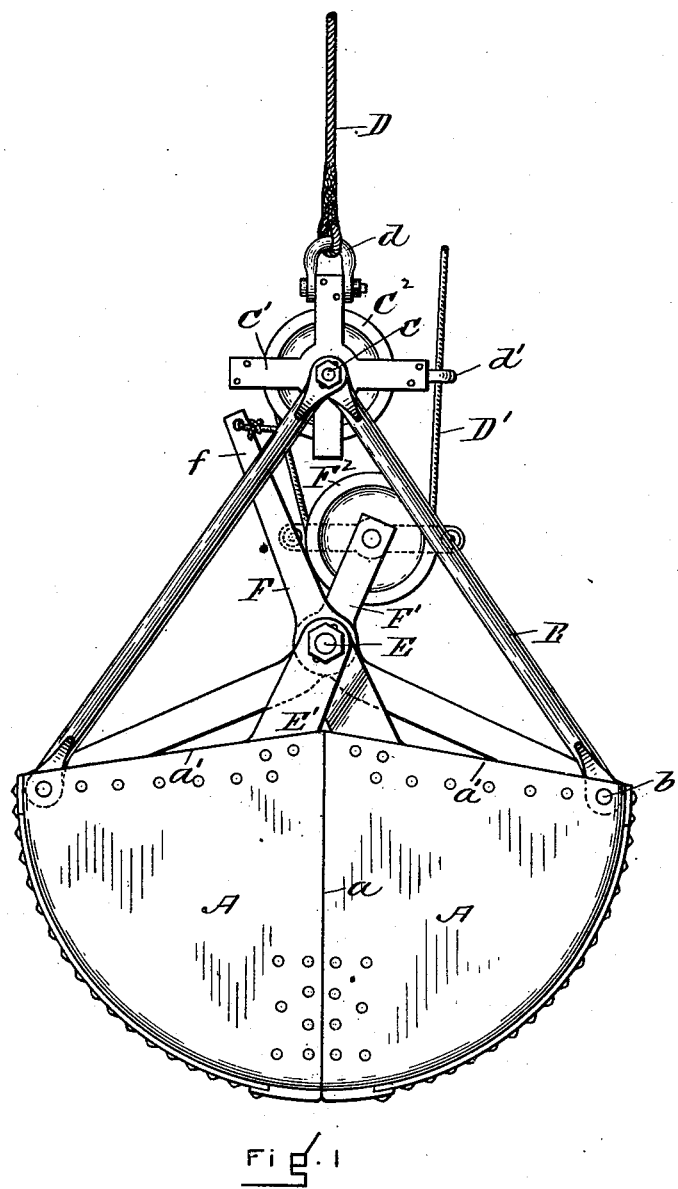
Figure 2:
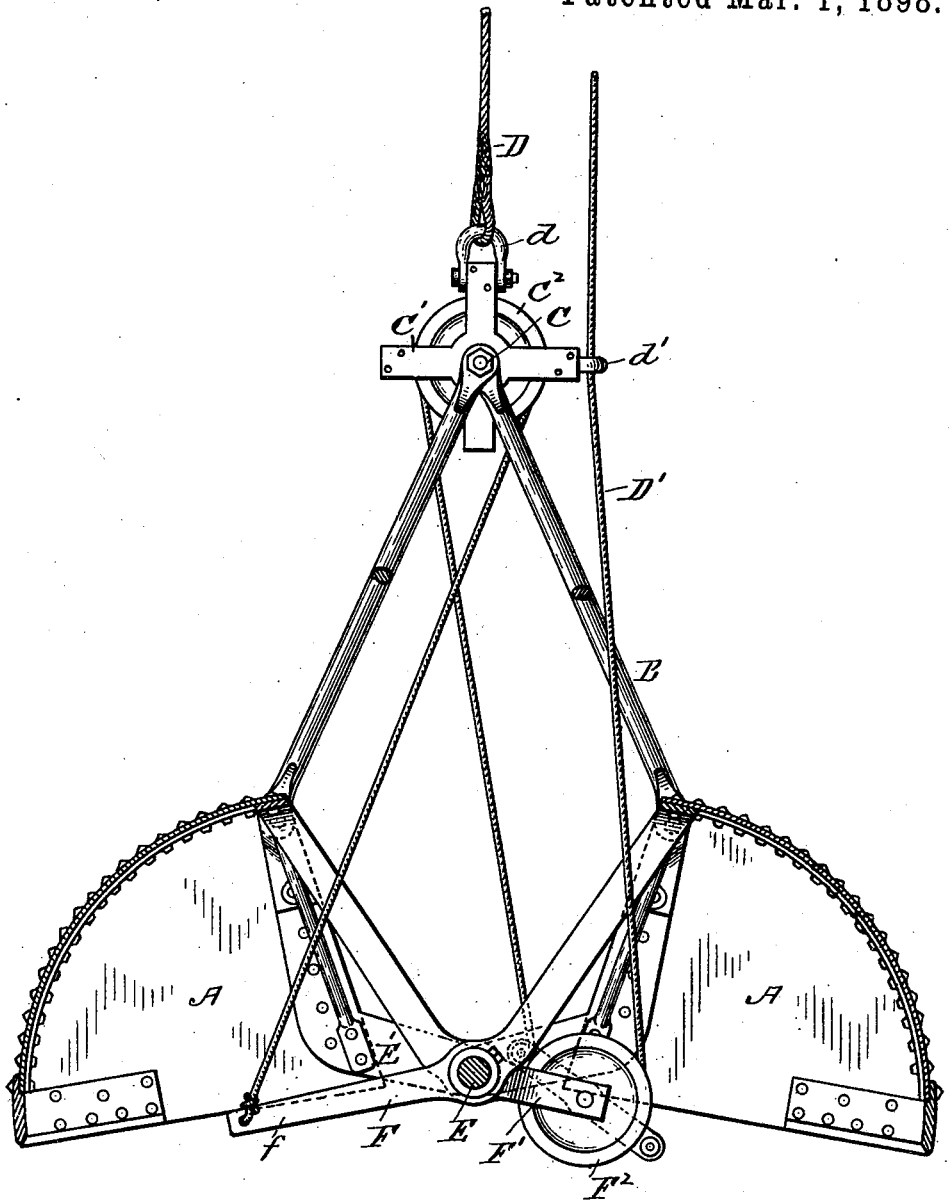
Figure 3:
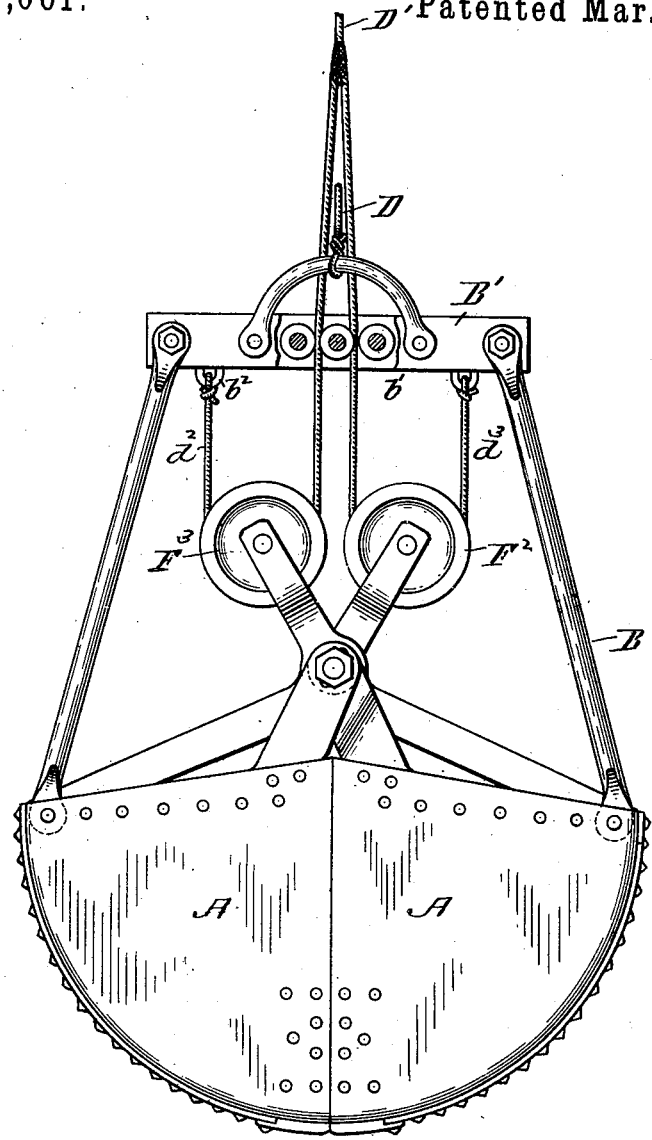

In the drawings, Figure 1 is a view in side elevation of a closed shovel equipped with our improvement. Fig. 2 is a similar view, partly in section, showing the shovel open. Fig. 3 shows in side elevation a modification.

The jaws A are of the usual shape, meeting when closed on the median line $a$. Their upper edges $a'$ form a line substantially horizontal, but rising slightly to a point in the center, as shown in Fig. 1. The jaws are supported by the arms B, which extend from the four upper corners thereof to the shaft C, carried by the pulley-hanger C'. The jaws A are pivoted to these arms at $b$, so that they can swing open when the shovel is lowered. The pulley-hanger C' is connected with the engine by the hoisting rope or chain D, which carries the stirrup-iron $d$, to which the pulley-hanger is attached. The shaft C carries the pulley or sheave $C^2$.

At a short distance above the jaws there is situated the shaft E, supported by the hinges E'. These hinges are of the shape shown in Figs. 1 and 2. They are bolted along the upper edges $a'$ of the jaws. The hinges are allowed to turn on the shaft for a purpose to be presently described. The shaft E is embraced by the levers F F'. These levers are attached to the upper sides of the jaws midway their length. They are of the same shape except that the arm $f$ of the lever F is twice as long as the corresponding arm of lever F', which carries the pulley or sheave $F^2$.

The closing rope or chain D' passes through the eye $d'$ on the pulley-hanger C', around the pulley $F^2$, then upwardly around the pulley $C^2$, and is attached to the end of the arm $f$ of the lever F. The weight of the shovel is so arranged that if the closing-rope is relaxed the shovel will open out and assume the position shown in Fig. 2. The shovel is then lowered into the hold of the coal-barge, the closing-rope is actuated by the engine, and the shovel is closed and scrapes up a load of coal. The opening and closing movement is like that of a pair of scissors.

In Fig. 3 we have shown a modification of our invention. The arms B are fastened at their upper ends to the cross-bar B', to which is attached in any desired way the hoisting-rope D. The cross-bar carries the rolls $b'$, between which the ropes $d^2$ $d^3$ render. These ropes are attached to eyes $b^2$ in the cross-bar, pass around the pulleys $F^2$ $F^3$, then between the rolls $b'$, and are united together and to the closing-rope D'. The rest of the construction is similar to that already described.

A shovel made according to our invention is very strong and works easily. The jaws being pivoted above their top line are enabled to open out widely, while the construction of the supporting-arms is such as to render the whole apparatus very stiff and steady. The closing-rope may be differently roved in respect to the ends of the arms F F' and the sheave $C^2$ without departing from the essential features of the invention.

Having thus fully described our invention, we claim and desire to secure by Letters Patent of the United States—

1. In a steam-shovel the combination of the jaws A, A, the arms B connected with the jaws as specified, the hinges E' extending from the jaws and connected as described and the levers F, F' connected at their outer ends with the shovel-jaws A, A, pivoted upon the shaft E and having diverging arms which are engaged and operated by the closing-rope D', as specified.

2. In a steam-shovel the combination of the jaws A, A, the rods B with which the jaws are connected as specified, the hinges E', the shaft E to which they are pivoted, the levers F F' pivoted upon said shaft and connected with the jaws A, A, as described, a pulley $F^2$ attached to one of said arms, the arm $f$ of the lever F being twice as long as the arm of the lever F' which carries the said pulley, the shaft $C^2$ and the drawing-rope D passing under the pulley $F^2$ about the sheave $C^2$ and attached to the end of the lever-arm $f$, as and for the purposes described.

JEREMIAH CAMPBELL.
DANIEL H. KELLEY.

Witnesses:
  F. F. RAYMOND, 2d,
  J. M. DOLAN.